(12) United States Patent
Montagnino et al.

(10) Patent No.: US 6,781,067 B2
(45) Date of Patent: Aug. 24, 2004

(54) FLOOR TILE SCALE WITH WALL DISPLAY

(75) Inventors: James G. Montagnino, St. Charles, IL (US); Anson Wong, Boca Raton, FL (US); Ricardo Murguia, Berywn, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 20 days.

(21) Appl. No.: 10/106,911

(22) Filed: Mar. 25, 2002

(65) Prior Publication Data

US 2003/0178233 A1 Sep. 25, 2003

(51) Int. Cl.⁷ .................. G01G 23/18; G04B 47/00; A51B 5/00
(52) U.S. Cl. .............. 177/25.13; 177/142; 177/173; 177/177; 177/25.19; 177/238; 368/10; 368/11; 600/301; 340/540; 340/573.1; 340/666
(58) Field of Search ................. 368/10, 11; 177/25.13, 177/25.19, 142, 173, 177, 238, 245; 702/174; 600/301; 340/540, 573.1, 666

(56) References Cited

U.S. PATENT DOCUMENTS

| | | | | |
|---|---|---|---|---|
| 1,833,496 A | | 10/1931 | Berson | 177/142 |
| 2,141,236 A | | 12/1938 | Benedict | 177/142 |
| 3,187,826 A | | 6/1965 | Traff | 177/142 |
| 3,838,744 A | * | 10/1974 | Tanji et al. | 177/177 |
| 4,082,153 A | * | 4/1978 | Provi | 177/177 |
| 4,271,492 A | * | 6/1981 | Battista | 368/10 |
| 4,316,273 A | * | 2/1982 | Jetter | 368/47 |
| 4,518,052 A | * | 5/1985 | Chen | 177/245 |
| 4,969,112 A | * | 11/1990 | Castle | 177/25.13 |
| 5,174,402 A | * | 12/1992 | Chen | 177/245 |
| 5,488,426 A | * | 1/1996 | Pack | 348/569 |
| 5,600,711 A | * | 2/1997 | Yuen | 379/102.03 |
| 5,638,339 A | * | 6/1997 | DeLoretto et al. | 368/10 |
| 5,691,932 A | * | 11/1997 | Reiner et al. | 368/10 |
| 5,886,952 A | * | 3/1999 | White | 368/10 |
| 6,032,119 A | * | 2/2000 | Brown et al. | 177/25.19 |
| 6,038,465 A | * | 3/2000 | Melton, Jr. | 177/25.19 |
| 6,278,499 B1 | * | 8/2001 | Darbee et al. | 348/734 |
| 6,403,897 B1 | * | 6/2002 | Bluth et al. | 600/301 |
| 6,541,714 B2 | * | 4/2003 | Montagnino | 177/178 |
| 6,583,369 B2 | * | 6/2003 | Montagnino et al. | 177/177 |
| 6,590,166 B2 | * | 7/2003 | Yoshida | 177/25.13 |
| 6,603,082 B1 | * | 8/2003 | Delbrück et al. | 177/142 |
| 6,603,711 B2 | | 8/2003 | Calace | 368/10 |
| 6,608,261 B2 | * | 8/2003 | Thadani | 177/238 |
| 6,678,215 B1 | * | 1/2004 | Treyz et al. | 368/10 |
| 6,679,854 B2 | * | 1/2004 | Honda et al. | 600/587 |

* cited by examiner

*Primary Examiner*—Randy W. Gibson
(74) *Attorney, Agent, or Firm*—Lawrence J. Shurupoff

(57) ABSTRACT

A body weigh scale that mounts into a floor of a room, for example in the floor of a bathroom, and that is designed to receive tiles or other floor covering materials thereon. A weighing mechanism of the body weigh scale generates weight information and transmits that weight information to a remote countertop or wall mounted display. The display may normally show a clock or another displayed item, and may convert its view to show weight units when a user steps on a platform. The display may also be configured to receive medical information from other medical devices, such as blood glucose monitors, heart rate monitors, or blood pressure monitors. The medical information may be shown by the display, may be received by the display and transmitted to another computer (e.g., at a hospital), or may be stored in the display for later transmission or evaluation.

30 Claims, 3 Drawing Sheets

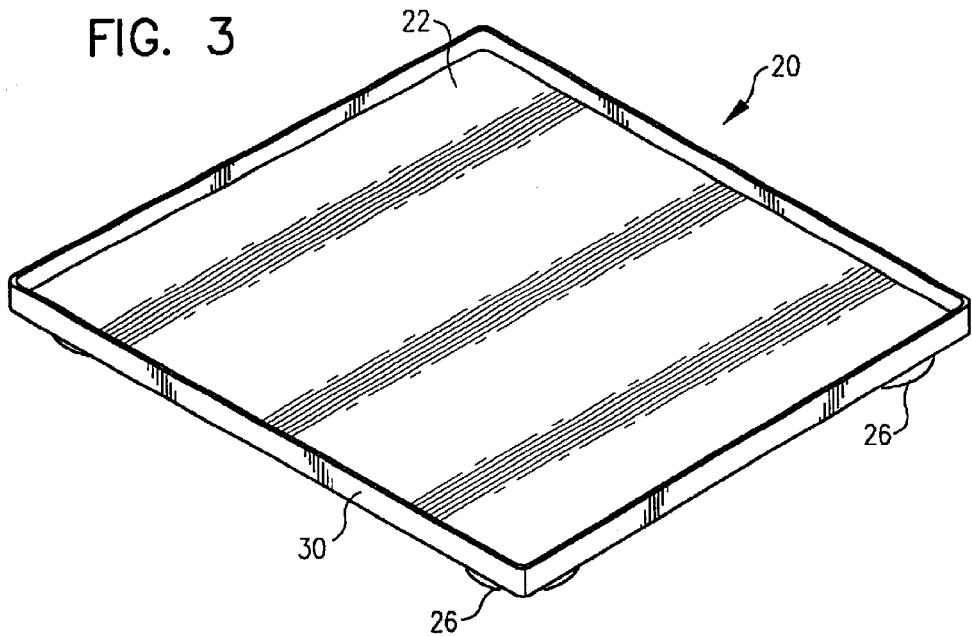
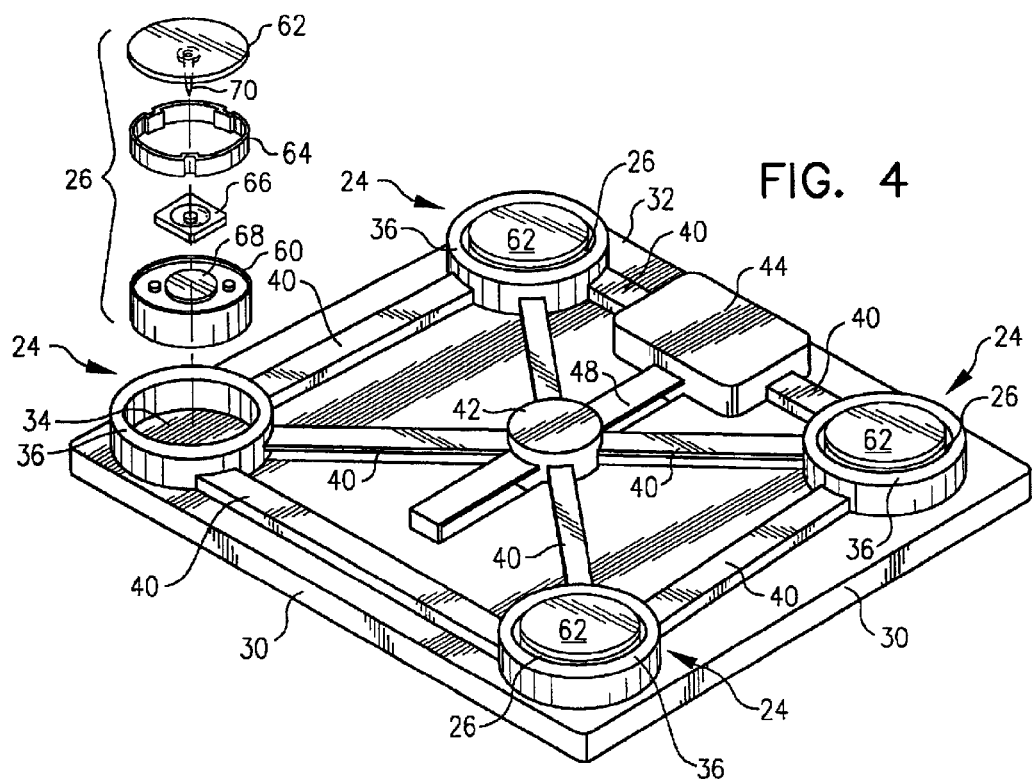

FLOOR TILE SCALE WITH WALL DISPLAY

FIELD OF THE INVENTION

The present invention relates to weigh scales, and more particularly to body weigh scales.

BACKGROUND OF THE INVENTION

Scales are devices that are used to determine the weight of an object by measuring the gravitational pull exerted on that object. Scales are commonly used to determine the physical amount or quantity of an item, such as a foodstuff, for example.

Body weigh scales can be found in many contemporary homes, usually in a bathroom. For this reason, body weigh scales are often called "bathroom scales." In general, body weigh scales include a load-receiving platform onto which a user steps, and the user's weight is then displayed somewhere on the scale, for example by a mechanical dial or by a digital readout of the user's weight. Body weigh scales allow a user to monitor his or her weight, usually before or after a shower, or just after waking up in the morning.

Many body weigh scales are mechanical, spring scales. In a spring scale, a platform is connected to a spring, which either stretches or compresses to balance a load (i.e., a person) placed on the platform. A needle, whose position depends on the extent to which the spring is stretched or compressed, indicates the weight of the load. Some mechanical scales include a pulse counter and a digital display upon which the user's weight is shown.

Electronic body weigh scales utilize electricity to measure loads. Electronic scales are faster, and generally more accurate, than their mechanical counterparts. A common type of electronic scale uses a strain-gauge load cell. This type of scale has a platform supported by a column, with a strain gauge or gauges fused to the column. A strain gauge is a thin wire whose electrical resistance changes when the wire is stretched or compressed. When a load is placed on the platform, the column and strain gauge are compressed. The corresponding change in resistance of the strain gauge can be used to determine the person's weight.

Although contemporary body weigh scales work well for their intended purpose, many consumers find the scales to be space-consuming devices. This problem may be particularly evident in small bathrooms, where the body weigh scales may interfere with foot traffic. Storing the scales in an out of the way location may be difficult or inconvenient, because the scales take a lot of valuable storage space. Moreover, many consumers find body weigh scales to be a necessary element for maintaining physical wellness in daily life, and putting a scale in and out of storage may be very inconvenient.

In addition, body weigh scales very often do not blend existing furnishings or decorating schemes. This problem is particularly evident in newer homes, which often have more modern decorating styles. Thus, consumers often would like to not have the body weigh scales visually displayed, but do not want to hassle with getting the scale out of storage, checking weight, and then putting the scale away again.

SUMMARY OF THE INVENTION

The present invention is directed to a body weigh scale that mounts into a floor of a room, for example in the floor of a bathroom. In accordance with one aspect of the present invention, the body weigh scale includes a load-receiving tray that is designed to receive a decorator tile matching that of the bathroom or the floor in which the body weigh scale is installed.

In accordance with another aspect of the present invention, a weighing mechanism of the body weigh scale generates weight information and transmits that weight information to a countertop or wall mounted display. The transfer of data may be through a wireless or wired connection, but preferably is a wireless, radio frequency (RF) communication.

In accordance with another aspect of the present invention, the display may normally show a clock or another displayed item, and may convert its view to show weight units when a user steps on a platform. Such a display may not only be used with a body weigh scale that is built into a floor, but also may be used with a stand-alone body weigh scale.

In accordance with another aspect of the present invention, the display may be configured to receive medical information from other medical devices, such as blood glucose monitors, heart rate monitors, or blood pressure monitors. The medical information may be shown by the display, may be received by the display and transmitted to another computer (e.g., at a hospital), or may be stored in the display for later transmission or evaluation. If transmitted at a later time, the data may be accumulated with other data within the display, and the accumulated data may be transmitted to a remote computer.

Other advantages will become apparent from the following detailed description when taken in conjunction with the drawings, in which:

BRIEF DESCRIPTION OF THE DRAWINGS

FIG. 3 is a top, perspective view of a load-receiving tray and weighing mechanism for the floor-mounted body weigh scale of FIG. 1;

FIG. 4 is bottom, exploded perspective view of the load-receiving tray and weighing mechanism of FIG. 3;

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "rear," and the like, the orientations are to aid the reader in understanding the invention, and are not meant to be limiting.

Figure 1:
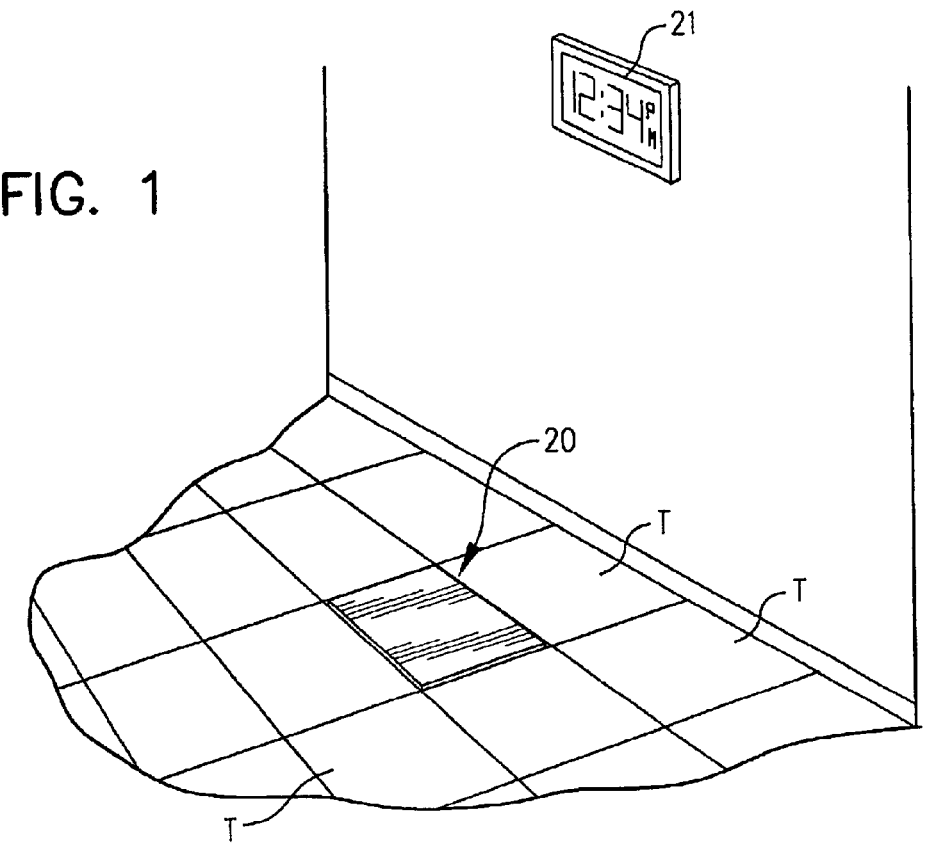
FIG. 1 is a perspective view of a display and a floor-mounted body weigh scale in accordance with an aspect of the present invention.
Figure 2:
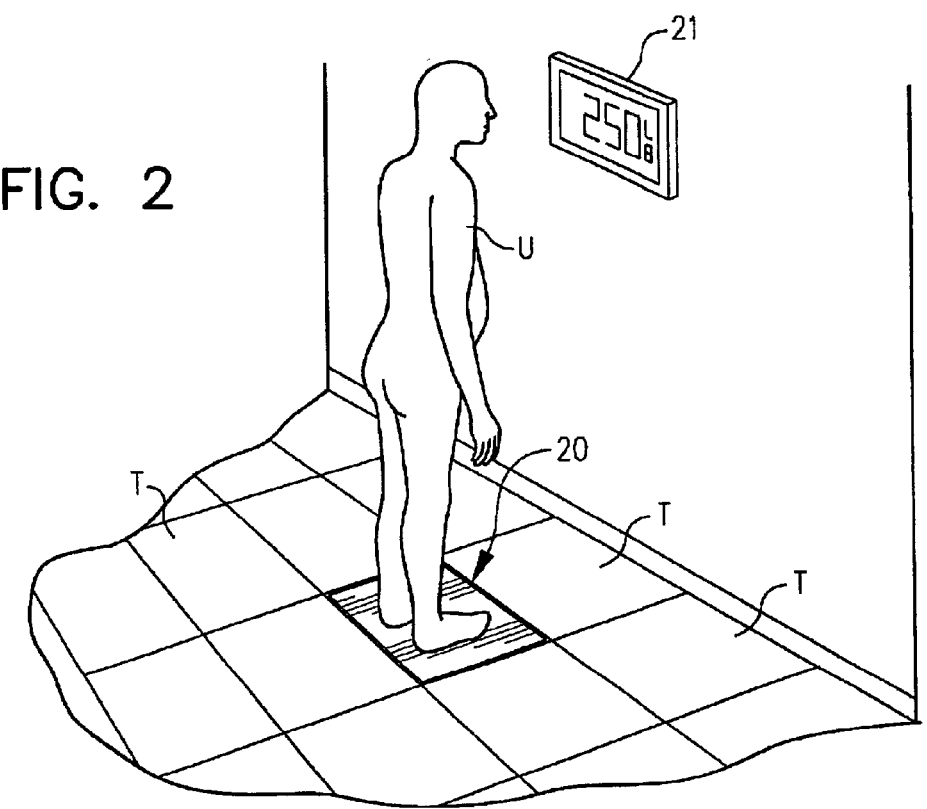
FIG. 2 is a perspective view, similar to FIG. 1, with a user standing on the floor-mounted body weigh scale.

Generally described, the present invention is directed to a body weigh scale 20 (FIG. 1) that is mounted in the floor of a room and that is configured to receive matching floor tiles T thereon. The body weigh scale 20 generates information about the weight of a user U (FIG. 2) that is standing on the body weigh scale, and transmits that information to a display 21. The display 21 then displays the user's weight.

Referring to FIG. 3 of the drawings, there is shown a weighing platform that forms the underlying structure for the body weigh scale 20. Generally described, the body weigh scale 20 includes a load-receiving tray 22 having a weighing mechanism on a bottom side. For description purposes only, the body weigh scale 20 shown in the drawings is described as utilizing a particular weighing mechanism, i.e., a strain gauge weighing mechanism. However, the features of the present invention may be used in many scale configurations having several different types of weighing mechanisms, including but not limited to, mechanical weighing mechanisms, pulse count weighing mechanisms, and electronic weighing mechanisms. In accordance with one aspect of the present invention, however, the weighing mechanism generates information about the weight of a user and that information is digital or may be converted to digital. In this manner, the weight information may be transmitted to a remote display, such as the display 21.

In any event, in the embodiment shown in FIG. 3, receptacles 24 (FIG. 4) are arranged at the corners of the bottom of the load-receiving tray 22. The receptacles 24 are configured to receive strain-gage load cells 26. In accordance with one aspect of the present invention, the load-receiving tray 22 and the receptacles 24 are formed of a non-corrosive material such as stainless steel, allowing the material to be incorporated into a floor of a home without worries of corrosion.

The load-receiving tray 22 for the body weigh scale 20 shown in the drawings is substantially square in shape, for example one foot by one foot in dimension. However, any size may be used that matches a desired tile pattern and that is sufficiently sized so that a user may stand thereon. The load-receiving tray 22 is preferably flat with a peripheral wall 30, but may be other shapes for a given application. In the embodiment shown in FIG. 1, one large tile T is fitted into the load-receiving tray 22, but the load-receiving tray may receive many tiles. In addition, the load-receiving tray 22 may receive hardwoods, linoleum, carpet, or other flooring surface materials.

As can be seen in FIG. 4, a bottom surface 32 of the load-receiving tray 22 is substantially flat, and includes the receptacles 24 for receiving the strain-gage load cells 26. A series of wire tracks 40 may be provided that extend along the bottom surface 32 of the load-receiving tray 22. The wire tracks 40 extend between the receptacles for the strain-gage load cells 26 (i.e., the indentations 34 for the strain-gage load cells 26), and to a central juncture 42. The wire tracks 40 are configured and arranged to house wires between the strain-gage load cells 26 and an electrical housing 44, and may, for example, be stamped out of the load-receiving tray 22. The electrical housing 44 serves as a location for mounting of the various electronics needed to convert the sensor signals into weight information that may be transmitted to the display 21. Although wire tracks 40 are shown in the disclosed embodiment, as can be understood, the wires may be routed in any suitable manner across the bottom surface 32 of the load-receiving tray 22, including crimping or otherwise attaching loose wires to the surface, and fewer or more wire tracks may be provided so as to provide routing for the necessary wiring.

Referring to the strain-gage load cells 26, their structure and operation form no part of the present invention and are well known in the art. The strain-gage load cells 26 may be, for example, the load support assemblies in U.S. Pat. No. 5,955,705 to Germanton, assigned to Measurement Specialties, Inc., and incorporated herein by reference. Other load cells may also be used with the load-receiving tray 22 of the present invention, such as piezoresistive, inductive, reluctance, and magnetostrictive load cells. However, for ease of description, the invention will be described with reference to use of the strain-gage load cells 26.

Although the reader may refer to the Germanton patent for a description of a strain-gage load cell, a simplified explanation of the structure and operation of a strain-gage load cell is generally described here for the reader's convenience. In general, a strain gage is a measuring element for converting force, pressure, tension, etc., into an electrical signal. The strain gauges themselves are bonded onto a beam or structural member that deforms when weight is applied. In many cases, four strain gages are used to obtain maximum sensitivity and temperature compensation. Two of the gauges are usually in tension, and two in compression, and are wired with compensation adjustments, for example in a Wheatstone bridge. When weight is applied, the strain changes the electrical resistance of the gauges in proportion to the load.

In the disclosed embodiment, the strain-gage load cells 26 each include a strain gage body 60 (FIG. 4) that houses the strain gages, a footpad 62, a boot 64, and a plastic spring element 66. The strain gage body 60 seats in one of the indentations 34 and is surrounded by the corresponding circular flange 36. The plastic spring element 66 is seated against a plate 68 on the bottom of the strain gage body 60. The plate 68 is attached to the strain gages. The boot 64 is formed of an elastomeric material, and surrounds the plastic spring element and the footpad 62, which includes a shaft 70 that engages the plastic spring element 66.

Figure 5:
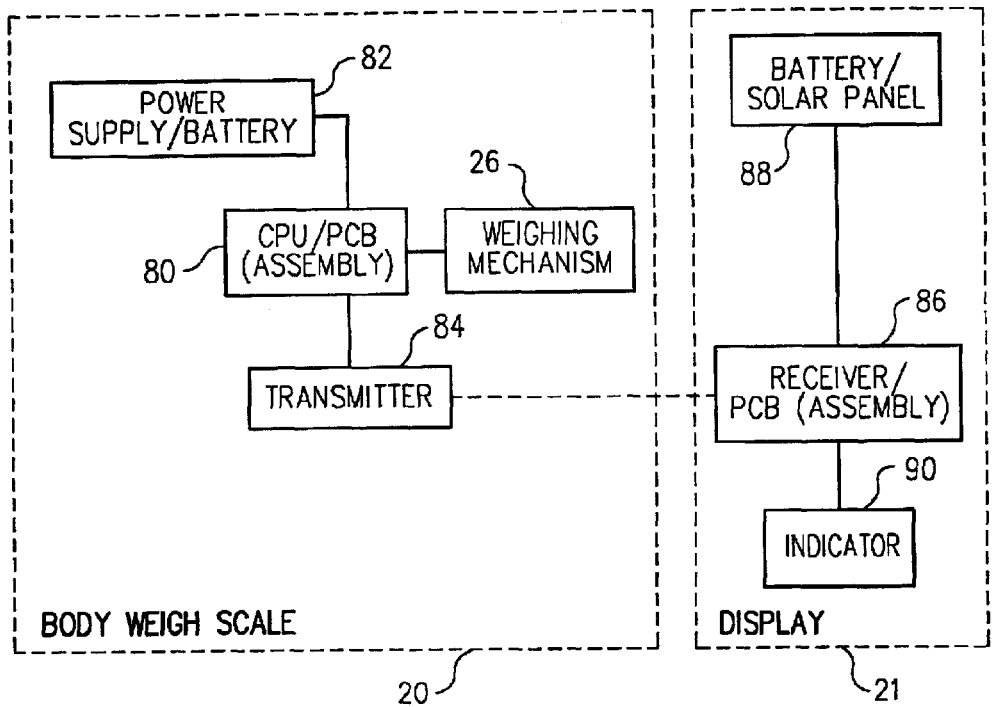
FIG. 5 is a simplified schematic diagram for the floor scale and display of FIG. 1.

In use, the footpads 62 engage the ground or other surface under the load-receiving tray 22, and when an object (e.g., a person) is placed on the top of the load-receiving tray 22, the boot 64 compresses against the force applied to the footpads, and the footpads in turn press (via the shaft 70) the plastic spring element 66 into the plate 66 on the bottom of the strain gage body 60. The strain gages then register the deformation of the plate 66 and send signals representing the strain to transducers, which in turn send an electronic signal to, for example, a printed circuit board (PCB) 80 (FIG. 5). The printed circuit board 80 or other related circuitry includes the various electronics needed to convert the sensor signals into weight information indicative of weight in a manner known in the art.

The weight information generated by the printed circuit board 80 may then be transmitted to the display 21. Alternatively, the signals from the transducers of the strain-gage load cells 26 may be sent as weight information to the display 21, and the display may include the various electronics needed to convert the sensor signals into a digital representation indicative of a weight in a manner known in the art.

The printed circuit board 80 includes a power supply 82, such as a battery, or a DC converter connected to an AC power supply. A transmitter 84 is connected to the printed circuit board 80 and is configured to transmit weight information from the printed circuit board 80 to the display 21.

The display 21 includes a receiver and printed circuit board assembly 86. The receiver of the assembly 86 is configured to receive the transmission from the transmitter 84, and the printed circuit board is configured to convert that information to digital display information, or other information that is sufficient to indicate the user's weight to the user. The printed circuit board 86 is powered by a battery, solar panel, or other power source 88. The output of the printed circuit board 86 is output to an indicator 90, such as a LCD display.

The printed circuit boards (PCB) 80, 86 each include a central processing unit (CPU), and may be any device or devices that can execute computer-executable instructions, such as program modules. Generally, program modules include routines, programs, objects, components, data structures and the like that perform particular tasks or implement particular abstract data types. Given the description herein, the printed circuit boards 80, 86 may be programmed by a programmer of ordinary skill to perform the functions and operations described herein. In addition, any of the features of the printed circuit boards 80, 86 may be combined and performed by one of the printed circuit boards, or the operations performed by one or each of the printed circuit boards may be distributed over a number of different devices, including, but not limited to, computers, microcomputers, or controls.

The indicator 90 in one embodiment is an LCD display. Different types of devices may be used for the indicator 90, such as an LED display, a CRT monitor, or other display devices, or weight may be indicated in another manner, such as by a recorded voice reading the user's weight in response to the user stepping on the scale. To this end, as used herein, the "display 21" need not include a visual representation, but instead is used broadly to mean any type of indicator. However, in accordance with one aspect of the present invention, the indicator 90 is a display that shows something other than a weight (e.g., a picture, a temperature reading for the room, a representation of a clock, or a projection from a camera) before a user steps on the scale, and, when a user steps on the body weigh scale 20, at least a portion of the display changes to display the weight upon the user stepping on the body weigh scale 20. In one embodiment, the display shows a digital clock, and the numbers for the clock are removed to display the weight of a user when the user steps on the body weigh scale. Alternatively, the weight may be displayed over another picture, or in a portion of a picture. Thus, the display in this embodiment shows a first view that is substantially not weight related (although a zero or other indication may be shown on part of the viewable image), and in a second view, responsive to a user or other load being placed on the body weigh scale, shows weight information regarding the load, by itself or combined with other information. The indicator 90 may be mounted on a wall, suspended from a ceiling, may be a countertop model, or may be free standing, for example.

The transmitter 84 is preferably configured to transmit wireless signals in radio frequency (RF). Likewise, the receiver 86 is configured to receive wireless RF signals. However, the transmitter 84 and the receiver 86 may be any conventional type of transmitter and receiver, including a hardwired transmission of the information, wherein a printed circuit board or similar device may not be needed at both the body weigh scale 20 and the display 21, a wireless infrared transmission, or others. Thus, the separate display 21 and floor-mounted body weigh scale 20 may be used with a hardwired connection between the two components, but such an embodiment does not have the flexibility of installation and removal that the wireless embodiment of the invention has. Moreover, wireless RF transmission is particularly advantageous in that a line of sight connection between the body weigh scale 20 and the display 22 is not needed.

Likewise, the wireless (e.g., RF) features of the present invention may be used with the display 21 and a body weigh scale that is not mounted in a floor. However, such an embodiment does not utilize the full advantages of the described embodiment, in that such a body weigh scale may be in the way or may not match the decor of the room in which it is used.

In operation, a user (e.g., the user U) steps on the body weigh scale 20, causing a signal to be generated and changing the display 21 from what a first view it was previously showing (e.g., a clock) to a second view that includes a display of the weight of the user. The weight may be displayed, for example, on a LCD display that shows the time when a user is not standing on the body weigh scale 20. As the user steps off of the body weigh scale 20, the display 21 may return to the first view (e.g., a clock). This change may occur, for example, after a predetermined amount of time, such as a few seconds (e.g., 3).

The scale mechanism thus described is unobtrusive and potentially invisible to an average person entering the room in which the body weigh scale 20 and the display 21 are located. To an unknowing observer, the body weigh scale 20 appears to be normal floor tile in the room. In addition, the display 21 is not unsightly, but instead appears to be a wall mounted clock or other display.

The remote display 21 provides another advantage, in that a user of the body weigh scale 20 does not have to look down toward his or her feet to see the user's weight. Instead, the display 21 may be positioned in a convenient location for viewing, such as at eye level. As such, a user U merely stands on the body weigh scale 20 and looks straight out to see a display of the weight of the user.

The remote display also provides line-of-sight viewing advantages for users with larger than normal midsections (stomach, breasts). Such users often are required to arch backward to see the display in a normal floor scale. In addition, such users may tend to shift their weight towards the rear edges of the scale to increase their view of the display, thus resulting in a high potential for an inaccurate weight reading.

Figure 6:
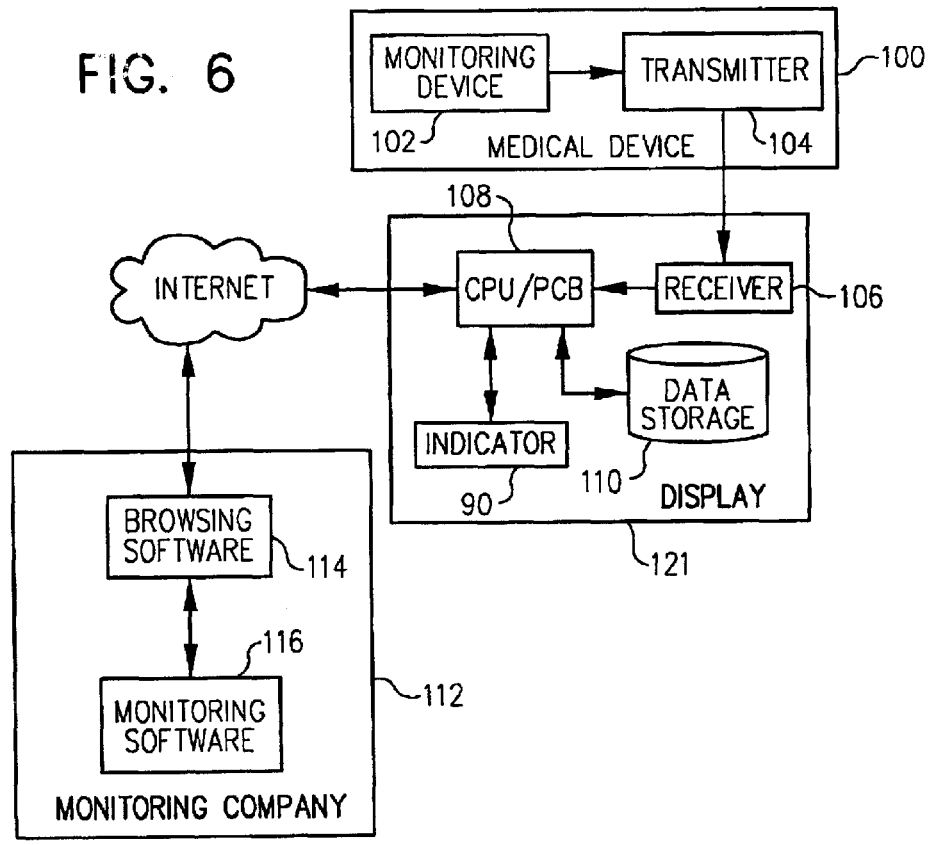
FIG. 6 is a simplified schematic diagram of an alternate embodiment of the present invention, in which medical information is transmitted by one or more medical devices to the display of FIG. 1.

In accordance with an aspect of the present invention, a medical device 100 (FIG. 6) may be configured to provide medical information to a display 121. The display 121 may be configured to perform the functions of the display 21 (i.e., to receive weight information from a body weigh scale), plus to receive medical information from the medical device 100. As another example, the display 121 may only receive information from the medical device 100. Like the display 21, in one embodiment the display 121 shows a first view (e.g., a clock) during nonuse periods, and a second view (e.g., including medical information) shows medical information, for example as a result of medical information being transmitted to the display 121 or the display being requested to display medical information (e.g., by the user or a monitoring company 112).

The medical device 100 may be, for example, a body fat percentage monitor, a heart rate monitor, a blood glucose monitor, a blood pressure monitor, or any other device that is capable of providing medical information about a user. The medical device 100 includes monitoring equipment 102 that generates the medical information regarding the user. A transmitter 104 is linked to the monitoring device 102 so that the medical information may be transmitted to a receiver 106 on the display 21. If not included in the monitoring device 102, a printed circuit board or other device may be included to instruct the transmitter 104 regarding transmission of data, and/or to convert the information from the monitoring device to a digital form that may be transmitted or perform the other functions required of the medical device 100.

The receiver 106 is linked to a printed circuit board (PCB) 108 having a CPU. As with the printed circuit board 80, this printed circuit board 108 may alternatively be one of a number of different devices that are capable of executing computer-executable instructions, such as program modules. The printed circuit board 108 may be linked to an indicator 90, described above, and/or data storage 110. In addition, the printed circuit board 108 may be linked to a monitoring company 112. The monitoring company 112 may be, for example, a hospital, a doctor's office, a computer that is set for automatic monitoring of a patient or patients, a monitoring component of a computer, or the like. The link to the monitoring company 112 may be via the Internet, a direct phone line connection, a wireless transmission, or another suitable connection. If made via the Internet, the monitoring company 112 may include browsing software 114 for accessing information sent by the display 21, and monitoring software 116 for handling the information that is accessed by the browser software.

In use, medical information is generated by the monitoring device 102 and is transmitted by the transmitter 104 to the receiver 106. The printed circuit board 108 may instruct the indicator 90 to display such information or otherwise handle the information (e.g., provide a verbal recognition of or reading of the medical information). Alternatively or additionally, the printed circuit board 108 may store the medical information in data storage 110, for use at a later time. For example, the printed circuit board 108 may store the information in data storage 110 and access and display the information on the indicator 90 in accordance with a request of a user (e.g., by pressing a button on the display 121). In addition, the printed circuit board 108 may transmit the medical information to the monitoring company 112, e.g., via the Internet.

If desired, the printed circuit board 108 may be programmed to store medical information (e.g., in the data storage 110) for a preset amount of time or until a particular amount of medical information has been gathered in data storage 110, and then may gather the information from the data storage at a particular time (e.g., once monthly) and transmit the gathered information to the monitoring company 112. Alternatively, the monitoring company 112 may request medical information from the display 21 after a preselected amount of time, such as once a month, and in response thereto, the printed circuit board may gather and send the information.

The printed circuit board 108 may also analyze the medical information that is received or that is stored in data storage 110. For example, an alarm or other indicator may sound if a blood glucose level reaches a certain level. Alternatively, medical information from multiple devices may be compared against standards. For example, a user's weight that is supplied to the display 21 by the body weigh scale 20 may be compared against a user's blood glucose level to determine if an alarm situation should be indicated on the indicator 90 or transmitted to the monitoring company 112. In addition, stored medical information may be displayed on a digital graph to show historical data. Personal data for more than one user may be stored or displayed.

A user or the monitoring company may advantageously program the medical device 100, the display 121, or the monitoring company 112 so that a desired set of features may be provided. The monitoring company 112, for example, may return a message to a user as a result of the medical information provided by the display 121. The message may then be, for example, displayed on the indicator 90. As can be appreciated, many combinations are available for use of the medical information.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A body weigh scale, comprising:
   a weighing mechanism;
   a radio frequency (RF) transmitter associated with the weighing mechanism and configured to send first wireless RF signals regarding weight information generated by the weighing mechanism;
   a receiver configured to receive the first wireless RF signals sent by the transmitter; and
   a display associated with the receiver, the display being configured to change from displaying a first image to displaying a second image responsive to the receiver receiving the first wireless RF signals, the first image being substantially independent of weight information, and the second image including information regarding the weight of the load based upon wireless signals sent by the transmitter.

2. The scale of claim 1, wherein the weighing mechanism is configured to be mounted in a floor of a building.

3. The scale of claim 2, wherein the weighing mechanism is configured to be mounted in a floor of a bathroom.

4. The scale of claim 1, wherein the display is configured to rest on a countertop.

5. The scale of claim 1, wherein the display is configured to hang on a wall.

6. The scale of claim 5, wherein the first image comprise a clock.

7. The scale of claim 6, wherein the first image comprises a digital clock having number locations, and wherein the second image comprises the weight information displayed at the number locations.

8. The scale of claim 1, wherein the first image comprises a digital clock having number locations, and wherein the second image comprises the weight information displayed at the number locations.

9. The scale of claim 5, wherein the display is further configured to receive medical information from a medical device, the medical information being independent of the weight information.

10. The scale of claim 9, wherein the display is further configured to store the medical information.

11. The scale of claim 10, wherein the display is further configured to display the medical information.

12. The scale of claim 9, wherein the display is further configured to forward the medical information to a monitoring component.

13. The scale of claim 12, wherein the display is further configured to forward the medical information via the Internet.

14. A body weigh scale, comprising:

a weighing mechanism configured to generate weight information in the form of a radio frequency (RF) signal responsive to a load on the weighing mechanism;

a radio frequency (RF) receiver for receiving the weight information via a wireless connection from the weighing mechanism;

a display, connected to the receiver, and configured to change from the display of a first image to the display of a second image including information related to the weight information, the first image being substantially independent of the weight information; and means for changing the first image to the second image responsive to the receiver receiving the radio frequency (RF) signal.

15. The scale of claim 14, wherein the display is configured to hang on a wall.

16. The scale of claim 15, wherein the first image comprises a clock.

17. The scale of claim 14, wherein the first image comprises a clock.

18. The scale of claim 14, wherein the display is further configured to receive medical information from a medical device, the medical information being independent of the weight information.

19. The scale of claim 18, wherein the display is further configured to store the medical information.

20. The scale of claim 19, wherein the display is further configured to display the medical information.

21. The scale of claim 18, wherein the display is further configured to forward the medical information to a monitoring component.

22. The scale of claim 21, wherein the display is further configured to forward the medical information via the Internet.

23. A health monitoring system, comprising:

a radio frequency (RF) receiver for receiving medical information via a wireless connection from a medical device;

a display, connected to the receiver, and configured to change from the display of a first image to the display of a second image including the medical information, the first image being substantially independent of the medical information; and means for changing the first image to the second image responsive to the receiver receiving a radio frequency (RF) signal.

24. The health monitoring system of claim 23, wherein the display is configured to hang on a wall.

25. The health monitoring system of claim 24, wherein the first image comprises a clock.

26. The health monitoring system of claim 23, wherein the first image comprises a clock.

27. The health monitoring system of claim 23, wherein the display is further configured to store the medical information.

28. The health monitoring system of claim 27, wherein the display is further configured to display the medical information.

29. The health monitoring system of claim 23, wherein the display is further configured to forward the medical information to a monitoring component.

30. The health monitoring system of claim 29, wherein the display is further configured to forward the medical information via the Internet.

* * * * *